United States Patent [19]

Day et al.

[11] Patent Number: 4,483,944
[45] Date of Patent: Nov. 20, 1984

[54] ALUMINUM TITANATE-MULLITE CERAMIC ARTICLES

[75] Inventors: John P. Day, Big Flats; Irwin M. Lachman, Corning, both of N.Y.

[73] Assignee: Corning Glass Works, Corning, N.Y.

[21] Appl. No.: 517,751

[22] Filed: Jul. 27, 1983

[51] Int. Cl.$^3$ .................. B01J 21/02; B01J 21/06; B01J 21/12

[52] U.S. Cl. .................. 502/439; 501/128; 502/527

[58] Field of Search ............. 502/439, 527; 428/116; 501/80, 128, 134

[56] References Cited

U.S. PATENT DOCUMENTS 4,118,240 10/1978 Takabatake .................. 501/134
4,327,188 4/1982 Endo et al. .................. 501/134

FOREIGN PATENT DOCUMENTS 1349020 4/1964 France.
1081142 8/1967 United Kingdom.

Primary Examiner—W. J. Shine
Attorney, Agent, or Firm—C. S. Janes, Jr.

[57] ABSTRACT

This invention is directed to the production of sintered ceramic articles wherein aluminum titanate and mullite constitute the predominant crystal phases and wherein the microstructure thereof evidences grain boundary and intracrystalline microcracking. The articles have base compositions encompassed within the area I, J, K, L, M, I of the drawing to which 0.5-5% $Fe_2O_3$ and/or 0.5-5% rare earth metal oxide may be added.

3 Claims, 1 Drawing Figure

U.S. Patent    Nov. 20, 1984    4,483,944
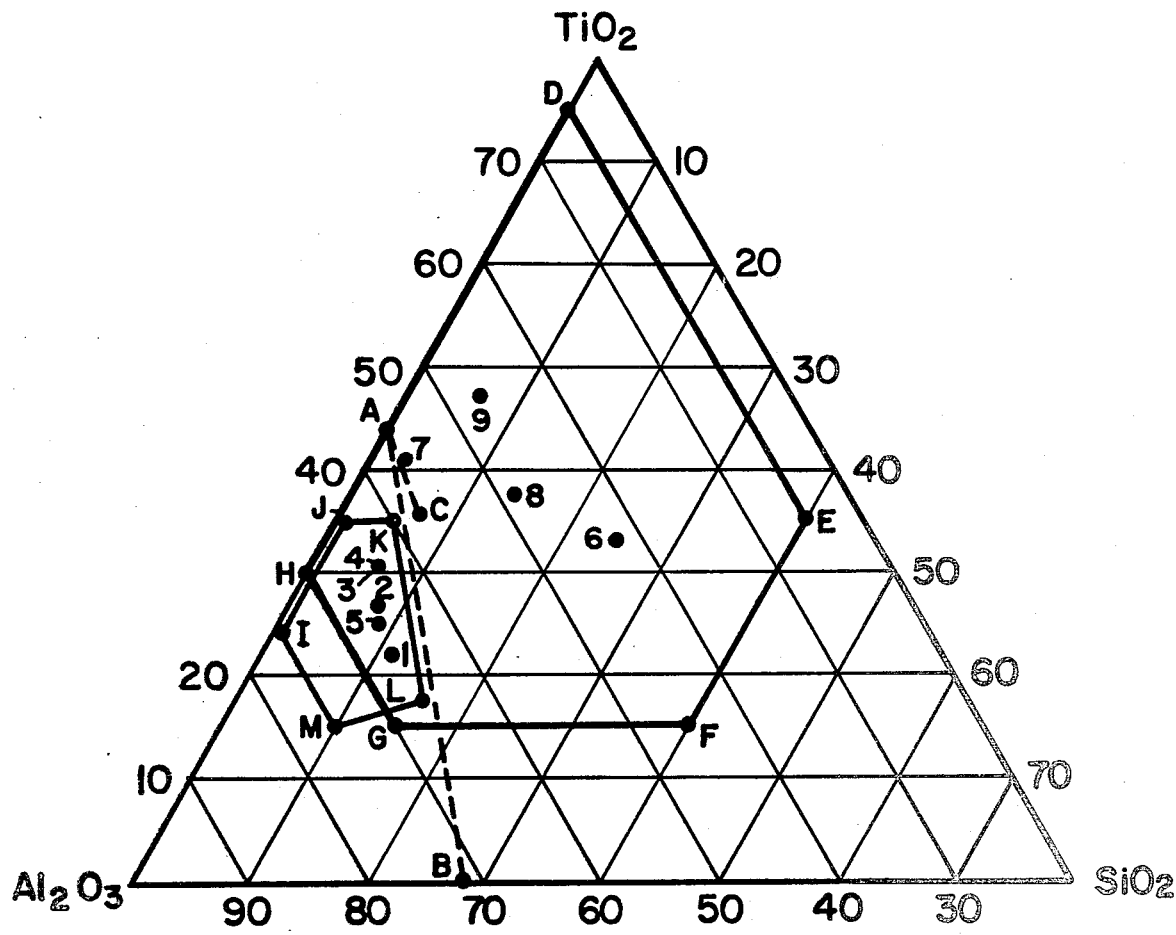

ALUMINUM TITANATE-MULLITE CERAMIC ARTICLES

BACKGROUND OF THE INVENTION

Ceramic honeycomb structures composed of a multitude of cells or passages separated by thin walls running parallel to the longitudinal axis of the structure with, in some instances, discontinuities designed to extend transversely through those walls are well known to the art. Such articles have been employed extensively as filters for fluids and as heat exchangers. More recently, the walls of those structures have been coated with a catalyst capable of converting noxious fumes from the discharge gases of internal combustion engines and wood stoves into non-noxious components. As can readily be appreciated, the environment inherent in those recent applications demands that the structures exhibit a complex matrix of chemical and physical properties. For example, the mechanical strength of the structure must be sufficient to withstand the mechanical forces encountered in mounting the structure plus the physical vibrations and pressures of the emission gases experienced in use along with high refractoriness, high thermal shock resistance, low thermal expansion, and good resistance to physical abrasion from particles in the emission gases and to chemical attack from the fumes therein.

Numerous materials have been proposed and tested as substrates for catalyst-coated honeycomb structures including alumina-silica, alumina, zirconia-alumina, zirconia-magnesia, mullite, zircon, zircon-mullite, titania, spinel, zirconia, $Si_3N_4$, and carbon. Only two materials, however, have actually seen any substantial service in that utility; viz., cordierite ($2MgO.2Al_2O_3.5SiO_2$) and beta-spodumene solid solution ($Li_2O.Al_2O_3.2-8SiO_2$).

Beta-spodumene solid solution has a very low coefficient of thermal expansion but its use temperature (<1200° C.) is so low as to severely restrict its utility in this application. Cordierite or cordierite + a compatible refractory phase, commonly mullite, has been employed extensively as substrate structures for automotive catalytic converters. Unfortunately, those substrates do not fully meet the combined demands of high thermal shock resistance and high service temperature at the same time. Substrates are occasionally subjected to short high temperature excursions, e.g., an automobile ignition malfunction in which the temperature exceeds 1465° C., the melting point of cordierite. Moreover, cordierite cannot meet the high temperature requirements of such applications as automotive light-off catalysts, catalytic converters for truck engines, molten metal filters, and high temperature heat exchangers. To raise the service temperature, the cordierite has in some instances been diluted with a highly refractory phase such as mullite. In so doing, however, the coefficient of thermal expansion is raised and the resistance to thermal shock is substantially decreased. Moreover, the service temperature is raised only for short time transient exposures because the cordierite fraction of the body will still melt at 1465° C. Accordingly, materials displaying higher refractoriness and thermal shock resistance have been sought for that application. U.S. Pat. Nos. 4,118,240 and 4,327,188 are illustrative of such work.

The former patent notes that, upon firing, microcracks develop in the body such that the average coefficient of thermal expansion thereof is quite low. Unfortunately, however, the presence of those microcracks sharply reduces the mechanical strength of the body. The mechanism underlying the microcracking phenomenon is explained in the patent in this manner. The $Al^{+3}$ sites in the aluminum titanate crystals are significantly larger than the ionic radius of $Al^{+3}$, so that $Al^{+3}$ ions are moved out of the crystals sites when the crystals are subjected to high temperatures. This results in a gradually increasing amount of $Al_2O_3$ being formed and the coefficient of thermal expansion of the product gradually increasing. $Ti^{+3}$ ions are formed via the reduction of $Ti^{+4}$ ions and the former move into the vacancies left by the $Al^{+3}$ ions. Hence, where aluminum titanate is exposed to high temperatures in a reducing environment, the decomposition of aluminum titanate through the change in crystal lattices can occur relatively rapidly.

The patent observed that the prior art had proposed the inclusion of $Mg^{+2}$, $Fe^{+3}$, or $Cr^{+3}$ ions to substitute for part of the $Al^{+3}$ ions. However, because the ionic radius of those three ions was only slightly larger than that of $Al^{+3}$ ions, the desired inhibiting effect upon the decomposition of aluminum titanate crystals was small. The patent disclosed that inhibition of the decomposition of aluminum titanate crystals could be significantly enhanced through the substitution of $Sn^{+4}$ and/or rare earth element ions for a portion of the $Al^{+3}$ ions. Lanthanum, cerium, and yttrium were explicitly reported as suitable rare earth elements for the inventive practice. $SiO_2$ was also incorporated to improve the mechanical strength of the bodies.

U.S. Pat. No. 4,327,188 is directed specifically to the production of ceramic honeycombs to be utilized as catalyst substrates. The articles were prepared from a combination of aluminum titanate and $SiO_2$ to which $Y_2O_3$ and/or $La_2O_3$ and/or $CeO_2$ may optionally and desirably be included. $SiO_2$ functions as a sintering aid and the rare earth elements not only perform as sintering aids, but also inhibit decomposition of aluminum titanate crystals when exposed to high temperatures. The amount of $Y_2O_3$ and/or $La_2O_3$ and/or $CeO_2$ required to be included can be reduced through adding a minor amount of $Fe_2O_3$. The honeycombs were asserted to be operable for continuous use at temperatures higher than 1450° C. and for short exposures to temperatures up to 1650° C.

Nevertheless, because of the severe environment to which the catalyst-coated honeycomb structure is subjected in emission control and other applications, the modified aluminum titanate bodies described above have not been fully satisfactory. Hence, where fabricated honeycombs are to be used as carriers for a catalyst, the ceramic must exhibit four critical characteristics; viz., very high refractoriness, high porosity for carrying the catalyst wash coat combination, high mechanical strength to permit the use of very thin walls in the honeycomb, thereby more effectively using the catalyst, and high thermal shock resistance. The intrinsic mechanical strength of the ceramic is of special criticality inasmuch as higher porosity results in lower strength. Consequently, a compromise must be struck between the desired high porosity and the needed mechanical strength.

Sintered bodies consisting essentially of aluminum titanate and mullite have been known to the art. Because the melting point of mullite is about 1880° C. and that of aluminum titanate is about 1860° C., the body resulting from firing a mixture of those two components would be expected to be highly refractory. Mullite ($3Al_2O_3.2SiO_2$) consists in weight percent of about 71.8% $Al_2O_3$ and 28.2% $SiO_2$. Aluminum titanate ($Al_2O_3.TiO_2$) consists in weight percent of about 56.06% $Al_2O_3$ and 43.94% $TiO_2$.

The appended drawing comprises a ternary composition diagram of the $Al_2O_3$—$TiO_2$—$SiO_2$ system in terms of weight percent. Point A designates the $Al_2O_3.TiO_2$ composition and Point B the mullite composition.

In WADC (Wright Air Development Center) Technical Report 53-165, June, 1953, *Aluminum Titanate and Related Compounds*, N. R. Thielke fired and tested a series of bodies having compositions along the join between $Al_2O_3.TiO_2$ and mullite, and also along the line connecting Points A and C.

British Pat. No. 1,081,142 describes the firing of compositions within the $Al_2O_3$—$TiO_2$—$SiO_2$ ternary to form bodies exhibiting melting points from 1600° C. to greater than 1800° C. and coefficients of thermal expansion ranging from $-15$ to $15 \times 10^{-7}/°C$. Sintering was carried out at 1400°–1600° C. $Li_2O$, ZnO, and the alkaline earth metal oxides were noted as useful sintering aids. The patent indicates that the addition of such highly refractory materials as $ThO_2$, $ZrO_2$, $Y_2O_3$, $CeO_2$, carbides, nitrides, borides, and sulfides raises the temperature at which the body can be used. A like phenomenon is stated to occur when a portion of the $SiO_2$ is replaced with $B_2O_3$ and/or $P_2O_5$.

Whereas no identification of the crystal phases present in the sintered products is provided, some of the compositions encompassed within the specification would yield $Al_2O_3.TiO_2$ and mullite crystals. Thus, the compositions are broadly stated to consist of $Al_2O_3$—$SiO_2$—$TiO_2$ in the mole ratio of $Al_2O_3$:0.05–1.5 $SiO_2$:0.5–1.5 $TiO_2$.

French Patent No. 1,349,020 discloses sintered refractory bodies consisting essentially, in weight percent, of 25–70% $Al_2O_3$, 15–75% $TiO_2$, 0–20% MgO, and 0–40% $SiO_2$ which are asserted may have melting temperatures of 1700°–1850° C. and coefficients of expansion of zero or less.

No identification of the crystal phases present in the final product was supplied, but the $SiO_2$-containing bodies could very well have a combination of $Al_2O_3.TiO_2$ and mullite crystals. The area bounded within Points D, E, F, G, H, D of the drawing reflects the $Al_2O_3$—$TiO_2$—$SiO_2$ compositions (exclusive of MgO) disclosed in the patent.

BRIEF DESCRIPTION OF THE DRAWING

The drawing depicts a three component composition diagram of the $Al_2O_3$—$TiO_2$—$SiO_2$ system expressed in terms of weight percent.

SUMMARY OF THE INVENTION

As has been explained above, substrates useful in catalytic converter structures and other high temperature applications must exhibit very high refractoriness, a low coefficient of thermal expansion ($<25 \times 10^{-7}/°C$. and, preferably, $<10 \times 10^{-7}/°C$. over the range of R.T.$-1000°$ C. when sintered at temperatures of 1400° C. and higher), excellent thermal shock, and high mechanical strength (a modulus of rupture generally above 2500 psi and preferably in excess of 4000 psi when sintered at 1400° C., and greater than 5000 psi and preferably in excess of 6000 psi when fired at 1500° C.). We have developed such articles from a narrow range of compositions within the $Al_2O_3$—$TiO_2$—$SiO_2$ system wherein the predominant crystal phase is $Al_2O_3.TiO_2$ with a minor presence of mullite. Compositions operable in the inventive subject matter are encompassed within the area I, J, K, L, M, I of the drawing, wherein Points I-M designate the following proportions of $Al_2O_3$, $TiO_2$, and $SiO_2$ reported in terms of weight percent:

|   | $Al_2O_3$ | $TiO_2$ | $SiO_2$ |
|---|---|---|---|
| I | 75.0 | 24.0 | 1.0 |
| J | 65.0 | 35.0 | 1.0 |
| K | 60.0 | 35.0 | 5.0 |
| L | 66.0 | 17.5 | 16.5 |
| M | 75.0 | 15.0 | 10.0 |

0.5–5% iron oxide, expressed in terms of $Fe_2O_3$, and/or 0.5–5% rare earth metal oxides will most desirably be present to serve as a sintering aid and to inhibit the decomposition of $Al_2O_3.TiO_2$ crystals when exposed to high temperatures. The rare earth oxides $La_2O_3$ and $Nd_2O_3$ have been found to be particularly useful to accomplish those purposes, although $Y_2O_3$ and $CeO_2$ are also operable.

Sintering temperatures on the order of 1650° C. and higher will generally be required. However, through the use of practices well known to the art such as the judicious choice of batch materials, the use of significant amounts of sintering aids, and the use of precalcined or prereacted clinker as a portion of the batch, the firing temperatures required can be reduced.

It must be recognized, nonetheless, that low temperature fired bodies are appropriate only in applications where the operating temperature to which the bodies are normally exposed is below the sintering temperature of the bodies, but where refractoriness may be demanded under circumstances where short term, over-temperature conditions may be experienced, or where the chemical properties of $Al_2O_3.TiO_2$-mullite bodies are desired. Bodies sintered at low temperatures will not generally be employed in applications involving temperatures significantly above that utilized in sintering, because further shrinkage of the body will occur which may render the body unsuitable for a particular application.

Nevertheless, this capability of sintering at lower temperatures, e.g., 1100° C., is of great interest economically since it permits the fabrication of bodies exhibiting the chemical properties of the $Al_2O_3.TiO_2$-mullite composite to be used in applications where the highest refractoriness of the composite is not demanded, but where the chemical inertness of the composite is of great significance. For example, the composite appears to be much more resistant to attack by the products generated in the gas stream in wood stove combustors than is cordierite. Thus, the inventive compositions can be employed over a wide range of applications including wood stove combustors, molten metal filters, diesel particulate filters, high temperature automotive emissions control substrates, heat exchangers, catalytic combustion substrates, kiln furniture and components for kiln structures, etc., the sintering temperature employed being governed by the temperatures encountered in each application. To illustrate, a sintering temperature of 1400° C. will customarily be sufficient for automotive emissions control substrates, thereby leading to a significant energy saving when compared to firing temperature of 1650° C. and higher. Firing shrinkages of the inventive compositions vary with the sintering temperature employed. For example, shrinkage averages about 1–12% over a temperature range of 1200°–1500° C. The shrinkage of bodies fired at 1400° C. generally ranges about 3–7%.

As can be observed from the drawing, the inventive compositions lie on the $Al_2O_3$-rich side of the $Al_2O_3.TiO_2$-mullite join. The resulting bodies demonstrate very high refractoriness, minimal liquid formation during sintering, which explains their low shrinkage, high strength as evidenced by modulus of rupture values in excess of 2500 psi and preferably above 4000 psi, and very low coefficients of thermal expansion.

Microscopic examination of the fired bodies showed the presence of very fine intracrystalline and grain boundary cracking. This microcracking enables the bodies to give under thermal stress thereby imparting very great thermal shock resistance to the inventive bodies.

For catalytic substrate applications porosity and pore size are important. Mercury porosimetry measurements indicated that total porosity and pore size vary with the firing temperature, the higher the temperature the lower overall porosity and the smaller the average pore size. For example, open porosity will average about 30–45% where a firing temperature of 1400° C. is utilized, whereas the average is reduced to about 8–26% where a 1500° C. sintering temperature is employed. Pore sizes generally range about 1–15 microns. In general, as the firing temperature is raised, the increased sintering reduces porosity, the pore size shrinks, and the grain size of the crystals becomes greater, thereby causing more microcracking and more effect of $Al_2O_3.TiO_2$.

DESCRIPTION OF PREFERRED EMBODIMENTS

Table I records five examples formulated to come within area I, J, K, L, M, I of the drawing expressed in terms of parts by weight of phase assemblage and additives. The batch ceramic materials were dry blended with (as weight percent of the total ceramic materials therein) 4% methyl cellulose plasticizer/binder and 0.5% alkali stearate extrusion aid. The mixtures were plasticized with water in a mix-muller, and further plasticized and deaired by pre-extrusion into spaghetti-like masses. Thereafter the fully plasticized and compacted batches were extruded into honeycomb green shapes, dried, and fired. Table I also reports the constituents of the five exemplary compositions in terms of approximate weight percent on the oxide basis. Examples 1–5 (normalized exclusive of $Fe_2O_3$, $La_2O_3$, and $Nd_2O_3$) are located within area I, J, K, L, M, I of the drawing.

TABLE 1

|  | 1 | 2 | 3 | 4 | 5 |
|---|---|---|---|---|---|
| Phase Assemblage + Additives | | | | | |
| Mullite | 40 | 30 | 20 | 20 | 31 |
| $Al_2O_3TiO_2$ | 50 | 60 | 70 | 70 | 57 |
| $Al_2O_3$ | 10 | 10 | 10 | 10 | 12 |
| $Fe_2O_3$ | 0.91 | 1.09 | 1.27 | 1.27 | 1.32 |
| $La_2O_3$ | 1.10 | 1.32 | 1.54 | — | — |
| $Nd_2O_3$ | 0.37 | 0.44 | 0.51 | — | — |
| Approximate Weight Percent | | | | | |
| $Al_2O_3$ | 65.2 | 63.4 | 61.6 | 62.9 | 65.4 |
| $TiO_2$ | 21.5 | 25.6 | 29.7 | 30.3 | 24.6 |
| $SiO_2$ | 11.0 | 8.3 | 5.4 | 5.5 | 8.6 |
| $Fe_2O_3$ | 0.89 | 1.06 | 1.24 | 1.26 | 1.32 |
| $La_2O_3$ | 1.07 | 1.28 | 1.49 | — | — |
| $Nd_2O_3$ | 0.36 | 0.43 | 0.49 | — | — |
| Normalized Exclusive of $Fe_2O_3$, $La_2O_3$, and $Nd_2O_3$ | | | | | |
| $Al_2O_3$ | 66.7 | 65.2 | 63.7 | 63.7 | 66.3 |
| $TiO_2$ | 22.0 | 26.3 | 30.7 | 30.7 | 25.0 |
| $SiO_2$ | 11.3 | 8.5 | 5.6 | 5.6 | 8.7 |

Table II recites the coefficient of thermal expansion (Coef. Exp.) expressed in terms of $\times 10^{-7}/°C$. determined over the range of R.T. (room temperature) to 1000° C. on one set of specimens of Examples 1–4 sintered for six hours at 1400° C. and another set of Examples 1–4 sintered for six hours at 1500° C. Table II also lists modulus of rupture (MOR) values expressed in terms of psi measured at room temperature on those specimens.

TABLE II

|  | 1 | 2 | 3 | 4 |
|---|---|---|---|---|
| MOR - 1400° C. | 4100 psi | 3600 psi | 4200 psi | 2700 psi |
| MOR - 1500° C. | 6920 psi | 6400 psi | 6320 psi | 5200 psi |
| Coef. Exp. - 1400° C. | 17.4 | 9.2 | 3 | 19.4 |
| Coef. Exp. - 1500° C. | 0.4 | −0.2 | −8.6 | 6 |

Table II illustrates that higher firing temperatures result in bodies of higher mechanical strength and lower coefficient of thermal expansion.

Example 5 was sintered for six hours at 1660° C. The resulting body exhibited a coefficient of thermal expansion (R.T.−1000° C.) of $12.9 \times 10^{-7}/°C.$, a porosity of 13.6%, and a mean pore size of about 12 microns.

To demonstrate the criticality of composition to obtain the desired properties in the final product, Examples 1, 2, and 4 of British Pat. No. 1,081,142, supra, and Sample 2 of French Pat. No. 1,349,020, supra, were batched and fired. Example 3 of the British patent was not studied because it contained a lithium compound, a material well known for its highly fluxing action. Sample 1 of the French patent was not investigated because it contained no $SiO_2$ so could not have mullite as a crystal phase.

Examples 1, 2, and 4 of the British patent were batched with the raw materials cited. No exemplary batch was provided from Sample 2 of the French patent so conventional ceramic materials were utilized to yield the recited oxide composition. Table III records the compositions of the four batches expressed in terms of weight percent on the oxide basis. Examples 6–8 represent Examples 1, 2, and 4, respectively, of the British patent, and Example 9 reflects Sample 2 of the French patent. Specimens of each were batched, mixed, extruded, and fired in like manner to Examples 1–4 of Table I. The temperature at which each specimen was fired for six hours is also reported in Table III. (Because no sintering temperature was provided for Sample 2 of the French patent, 1510° C. was used as a matter of convenience since such was utilized in Example 4 of the British patent. In any event, firing temperatures of 1500°–1550° C. are believed equivalent for all practical purposes with these compositions.) Finally, Table III lists room temperature modulus of rupture values (psi) and coefficients of thermal expansion (R.T.−1000° C.), expressed in terms of $\times 10^{-7}/°C.$, determined on the specimens. Examples 6–9 are located in the drawing, Example 9 being normalized to ignore the minor MgO content.

TABLE III

|  | 6 | 7 | 8 | 9 | 9 Normalized |
|---|---|---|---|---|---|
| $SiO_2$ | 25.0 | 3.0 | 14.2 | 6.3 | 6.5 |
| $TiO_2$ | 33.0 | 40.5 | 37.4 | 45.2 | 46.9 |
| $Al_2O_3$ | 42.0 | 56.5 | 48.4 | 44.9 | 46.6 |
| MgO | — | — | — | 3.6 | — |
| Firing Temp. | 1510 | 1530 | 1510 | 1510 | |
| Modulus of Rupture | 6110 | 1520 | 2320 | 2160 | |
| Coef. Therm. Exp. | 23.9 | 21.3 | 35.5 | 7.9 | |

As can be observed from the above, either the mechanical strength, the coefficient of thermal expansion, or both fail to satisfy the requirements of the inventive materials.

The inventive materials are particularly useful in honeycomb configurations as diesel particulate filters such as are described in U.S. Pat. No. 4,329,162 and as substrates for catalytic converter means in wood stove combustors such as are disclosed in U.S. Pat. Nos. 4,330,503 and 4,345,528.

We claim:

1. A sintered ceramic article containing aluminum titanate and mullite as the predominant crystal phases and which is characterized by grain boundary and intracrystalline microcracking, said article exhibiting high refractoriness, excellent thermal shock resistance, a coefficient of thermal expansion (R.T.—1000° C) less than $25 \times 10^{-7}/°C$. when sintered at temperatures of 1400° C. and higher, a modulus of rupture greater than 2500 psi when sintered at 1400° C. and greater than 5000 psi when sintered at 1500° C., and having a composition bounded by Points I, J, K, L, M, I of the drawing.

2. A sintered ceramic article according to claim 1 also containing in weight percent 0.5–5% $Fe_2O_3$ and/or 0.5–5% of at least one rare earth metal oxide.

3. A sintered ceramic article according to claim 2 wherein said rare earth metal oxide is selected from the group of $La_2O_3$ and $Nd_2O_3$.

* * * * *